(12) United States Patent
Nitta et al.

(10) Patent No.: US 6,203,468 B1
(45) Date of Patent: Mar. 20, 2001

(54) CONTROL DEVICE FOR HYBRID VEHICLE AND METHOD THEREOF

(75) Inventors: Tomoaki Nitta; Yoshitaka Jinbo, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/440,812

(22) Filed: Nov. 15, 1999

(30) Foreign Application Priority Data

Nov. 18, 1998 (JP) ................................. 10-328640
Nov. 18, 1998 (JP) ................................. 10-328641
Nov. 18, 1998 (JP) ................................. 10-328642

(51) Int. Cl.$^7$ .................................................. B60K 41/02
(52) U.S. Cl. .................................. 477/5; 477/20; 477/91; 477/107
(58) Field of Search ................................. 477/5, 6, 8, 14, 477/20, 39, 77, 80, 84, 85, 91, 97, 107, 109, 175

(56) References Cited

U.S. PATENT DOCUMENTS 5,031,479 * 7/1991 Ibamoto et al. .................. 477/107 X
5,562,565 * 10/1996 Moroto et al. ........................ 477/8 X
5,907,191 * 5/1999 Sasaki et al. .......................... 290/19
5,967,940 * 10/1999 Yamaguchi .......................... 477/107
5,983,740 * 11/1999 Salecker et al. ................. 477/109 X

FOREIGN PATENT DOCUMENTS 898322    4/1996    (JP) .

* cited by examiner

*Primary Examiner*—Charles A Marmor
*Assistant Examiner*—Ha Ho
(74) *Attorney, Agent, or Firm*—Martin A. Farber

(57) ABSTRACT

Fluctuations in rotating speed or in toque at the time of switching between series drive and parallel drive operations are prevented. When switching from series drive mode to parallel drive mode, the rotating speed Nb of a motor B is detected and a rotating speed command is transmitted to match the rotating speed Na of a motor A with the rotating speed Nb of the motor B. When the actual rotating speed Na of the motor A has become equal to the rotating speed Nb of the motor B, a torque command which causes torque Teg of an engine to become zero is transmitted and, then, a command for engaging a lock-up clutch is transmitted. When switching from the parallel drive mode to the series drive mode, the engine torque is gradually reduced and the motor B is controlled to output a torque corresponding to the amount of reduction in the engine torque. The rotating speed Na of the motor A is matched with the rotating speed Nb of the motor B and the lock-up clutch is disengaged when the engine torque has become zero.

2 Claims, 7 Drawing Sheets

CONTROL DEVICE FOR HYBRID VEHICLE AND METHOD THEREOF

BACKGROUND OF THE INVENTION

1. Field of the Invention

The present invention relates to a control device for a hybrid vehicle which jointly uses an engine and two electric motors. More particularly, the invention pertains to a control device for a hybrid vehicle having the ability to switch it between series drive mode and parallel drive mode depending on running conditions.

2. Description of the Related Art

Among vehicles including motor vehicles, hybrid vehicles which jointly use an engine and electric motors have been developed in recent years due to their low-pollution and resource-saving features. These hybrid vehicles employ many techniques for achieving an improvement in kinetic energy recovery efficiency and for maintaining running performance by installing two motors, one for power generation and the other as a power source.

One known example of a hybrid vehicle of this kind is made such that it is switched between series drive operations, in which the hybrid vehicle runs while driving a motor for electric power generation with mechanical output of an engine and then driving a motor for running with both generated electric power and electric power output discharged from a battery, and parallel drive operation, in which the hybrid vehicle runs mainly with the mechanical output of the engine and the difference between required output and the mechanical output of the engine is made up for by means of the motors, depending on running conditions.

As an example, Japanese Patent Laid-Open No. 98322/1996 discloses a series-parallel hybrid electric vehicle comprising an engine, a generator driven by mechanical output of the engine, a battery charged with electricity generated by the generator, a motor driven by electric power discharged from the battery, and coupling/decoupling means like a clutch for establishing and breaking a mechanical link between the generator and the motor.

In the aforementioned series-parallel hybrid electric vehicle, series drive operation is selected when the clutch is engaged, while parallel drive operation is selected when the clutch is disengaged, and the rotating speed of the generator is matched with that of the motor before the clutch is engaged to avoid shocks caused by its engagement.

It is, however, likely that fluctuation in toque occurs due to a difference in output torque between the engine and motor sides at the time of switching from series drive operations to parallel drive operation if the clutch is engaged simply upon matching the rotating speed of the generator with that of the motor. Fluctuation in toque may also occur at the time of switching from the parallel drive operation to the series drive operation if the clutch is simply disengaged.

SUMMARY OF THE INVENTION

This invention has been made in view of these circumstances.

Accordingly, it is an object of the invention to provide a control device for a hybrid vehicle which makes it possible to prevent fluctuations in rotating speed or in toque at the time of switching between series drive and parallel drive operations and achieve smooth running without deteriorating a feeling of comfortable driving.

In a first embodiment, the invention relates to a control system for a hybrid vehicle having an internal combustion engine mounted on the vehicle for outputting a driving force via an output shaft, a lockup clutch mechanically and coaxially connected to the engine for connecting and disconnecting the driving force to a driving wheel, a transmission rotatably connected to the lockup clutch for changing a rotating speed thereof, a battery mounted on the hybrid vehicle for storing and providing an electric energy therefrom to various electric equipment, an accelerator pedal sensor provided in vicinity of an accelerator pedal for detecting a depressed amount thereof and for producing an accelerator signal, a brake switch provided near a brake pedal for detecting whether or not a driver steps thereon and for generating a brake signal when the driver steps thereof, and an inhibitor switch attached on a gear select mechanism for detecting whether a select lever is set in a drive range (D) and a rear range (R) or not and for outputting an ON signal when the lever is set in at least either one of the ranges, comprising:

a first motor (A) interposed between the output shaft and the lockup clutch and electrically connected to the battery for generating an auxiliary electric energy and for returning thereof to the battery when the lockup clutch is released while the vehicle is running in a series running mode;

a second motor (B) interposed between the first motor (A) and the transmission and electrically connected to the battery for assisting the engine when the lockup clutch is connected while the vehicle is running in a parallel running mode;

a planetary gear interposed between the lockup clutch and the second motor (B) for alternatively and effectively using the motors (A) and (B) so as to be changeable to a motor or a generator as required; and electronic hybrid engine control means responsive to the accelerator signal, the brake signal, the ON signal for connecting the lockup clutch after setting the driving force to substantially zero in addition to making an r.p.m. of the first motor (A) to coincide with the r.p.m. of the second motor (B) when a driving condition is transiting from the series running mode to the parallel running mode and for disconnecting the lockup clutch after making the r.p.m. of the first motor (A) to coincide with the r.p.m. of the second motor by gradually increasing the r.p.m. of the second motor (B) at the time of when the driving force becomes substantially zero by incrementally adding a driving torque of the second motor (B) as much as a decreased torque of the engine when the driving condition is transiting from the parallel running mode to the series running mode in addition to gradually decreasing the driving force so as to correctly avoid uncomfortable changes of the r.p.m. and torque without deteriorating a good drive feeling and to effectively realize a smooth running of the vehicle.

In a second embodiment, the invention relates to a control method for a hybrid vehicle having, an internal combustion engine mounted on the vehicle for outputting a driving force via an output shaft, a lockup clutch mechanically and coaxially connected to the engine for connecting and disconnecting the driving force to a driving wheel, a transmission rotatably connected to the lockup clutch for changing a rotating speed thereof, a battery mounted on the hybrid vehicle for storing and providing an electric energy therefrom to various electric equipment, an accelerator pedal sensor provided in vicinity of an accelerator pedal for detecting a depressed amount thereof, a brake switch provided near a brake pedal for detecting whether or not a driver steps thereon, and an inhibitor switch attached on a gear select mechanism for detecting whether a select lever is set in a drive range (D) and a rear range (R) or not, comprising the steps of:

generating a first auxiliary electric energy by interposing a first motor (A) between the output shaft and the lockup clutch and by electrically connecting to the battery when the lockup clutch is released while the vehicle is running in a series running mode;

assisting the engine by a second motor (B) interposed between the first motor (A) and the transmission and electrically connected to the battery when the lockup clutch is connected while the vehicle is running in a parallel running mode;

interposing a planetary gear between the lockup clutch and the second motor (B) in order to alternatively and effectively use the motors (A) and (B) as required; and connecting the lockup clutch by electronic hybrid engine control means after setting the driving force to substantially zero in addition to making an r.p.m. of the first motor (A) to coincide with the r.p.m. of the second motor (B) when a driving condition is transiting from the series running mode to the parallel running mode; and disconnecting the lockup clutch after making the r.p.m. of the first motor (A) to coincide with the r.p.m. of the second motor by gradually increasing the r.p.m. of the second motor (B) at the time of when the driving force becomes substantially zero by incrementally adding a driving torque of the second motor (B) as much as a decreased amount of torque of the engine when the driving condition is transiting from the parallel running mode to the series running mode in addition to gradually decreasing the driving force so as to correctly avoid uncomfortable changes of the r.p.m. and torque without deteriorating a good drive feeling and to effectively realize a smooth running of the vehicle.

According to the hybrid vehicle in the first embodiment of the invention, it can be run by switching itself between the parallel drive mode in which the lock-up clutch is disengaged and the first motor connected between the output shaft of the engine and the sun gear of the planetary gear is driven as a generator, whereby the motive power of the second motor connected to the ring gear of the planetary gear is used as the main source of driving power, and the series drive mode in which the lock-up clutch is engaged to couple the sun gear and the carrier of the planetary gear, the motive power of the second motor fed from the ring gear is added to the motive power of the engine fed from the sun gear and the sum is output from the carrier, whereby the motive power of the engine alone or the sum of the motive power of both the second motor and the engine is used as the source of driving power.

When switching the vehicle from the series drive mode to the parallel drive mode, the lock-up clutch is engaged upon making the driving torque of the engine substantially equal to zero after substantially matching the rotating speed of the first motor with the rotating speed of the second motor.

When switching the vehicle from the parallel drive mode to the series drive mode, the driving torque of the engine is gradually reduced while gradually increasing the driving torque of the second motor by an amount corresponding to the amount of reduction in the driving torque of the engine, and the lock-up clutch is disengaged after substantially matching the rotating speed of the first motor with the rotating speed of the second motor at the time the driving torque of the engine has become substantially zero.

DESCRIPTION OF THE PREFERRED EMBODIMENTS

Figure 1:
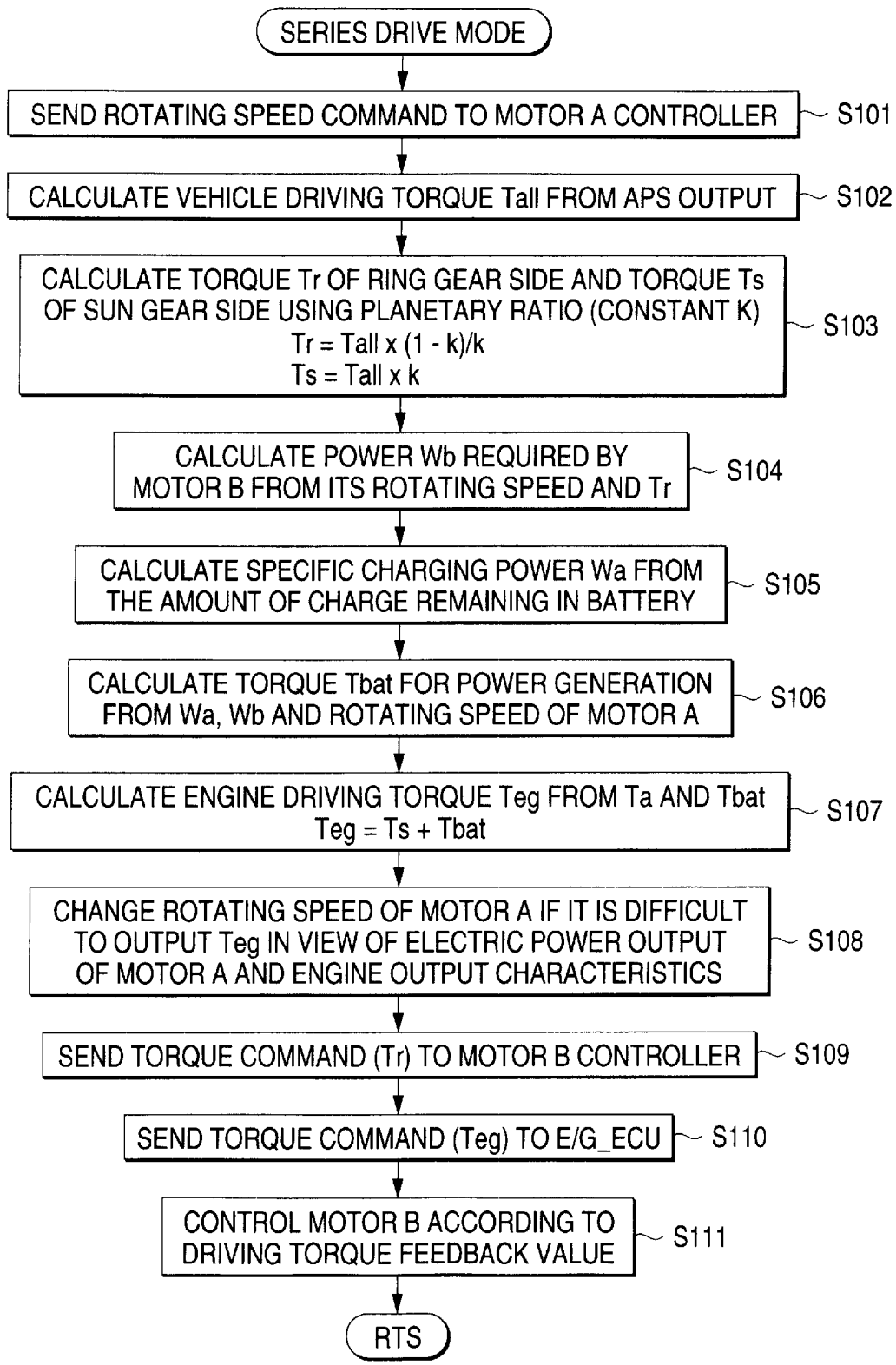
FIG. 1 is a flowchart showing a control routine for series drive mode.
Figure 2:
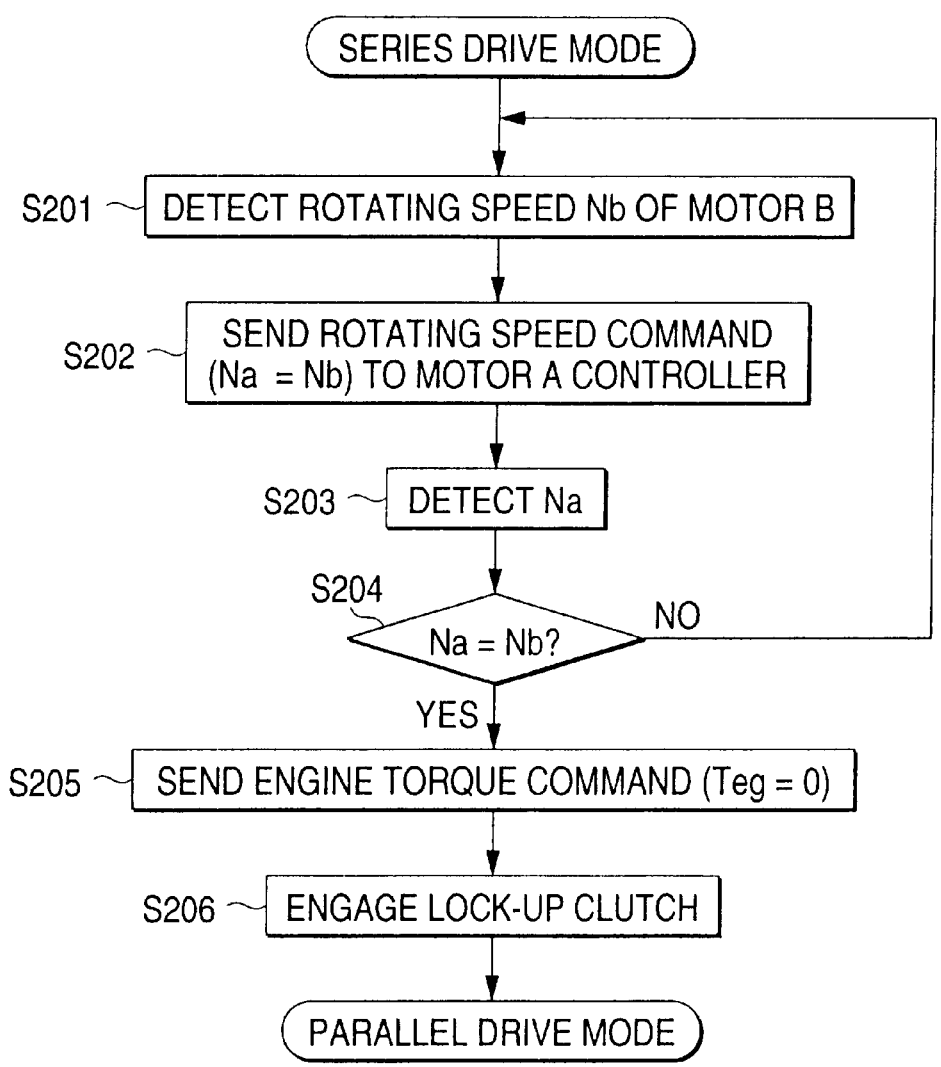
FIG. 2 is a flowchart showing a switching control routine applicable when switching from the series drive mode to parallel drive mode.
Figure 3:
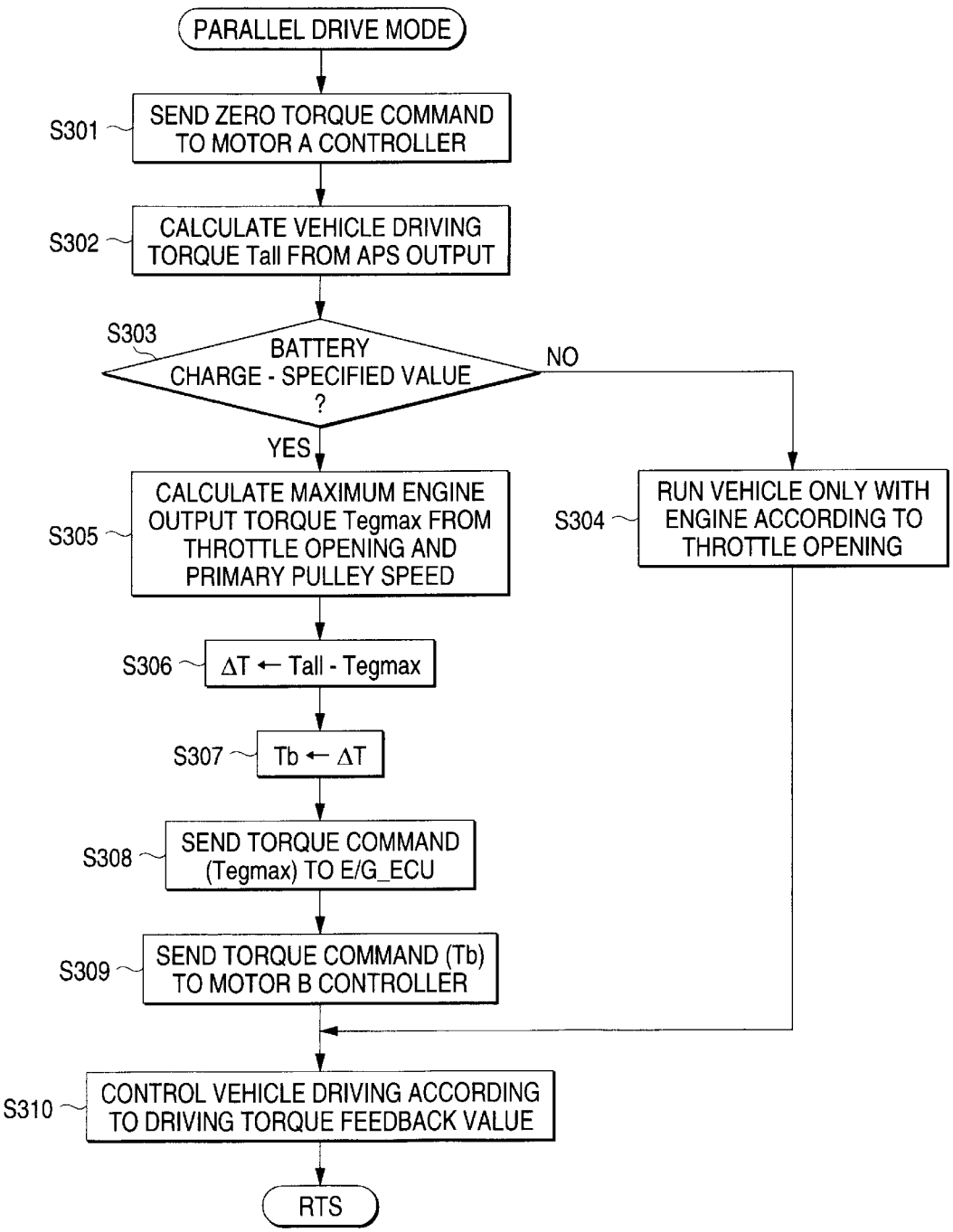
FIG. 3 is a flowchart showing a control routine for the parallel drive mode.
Figure 4:
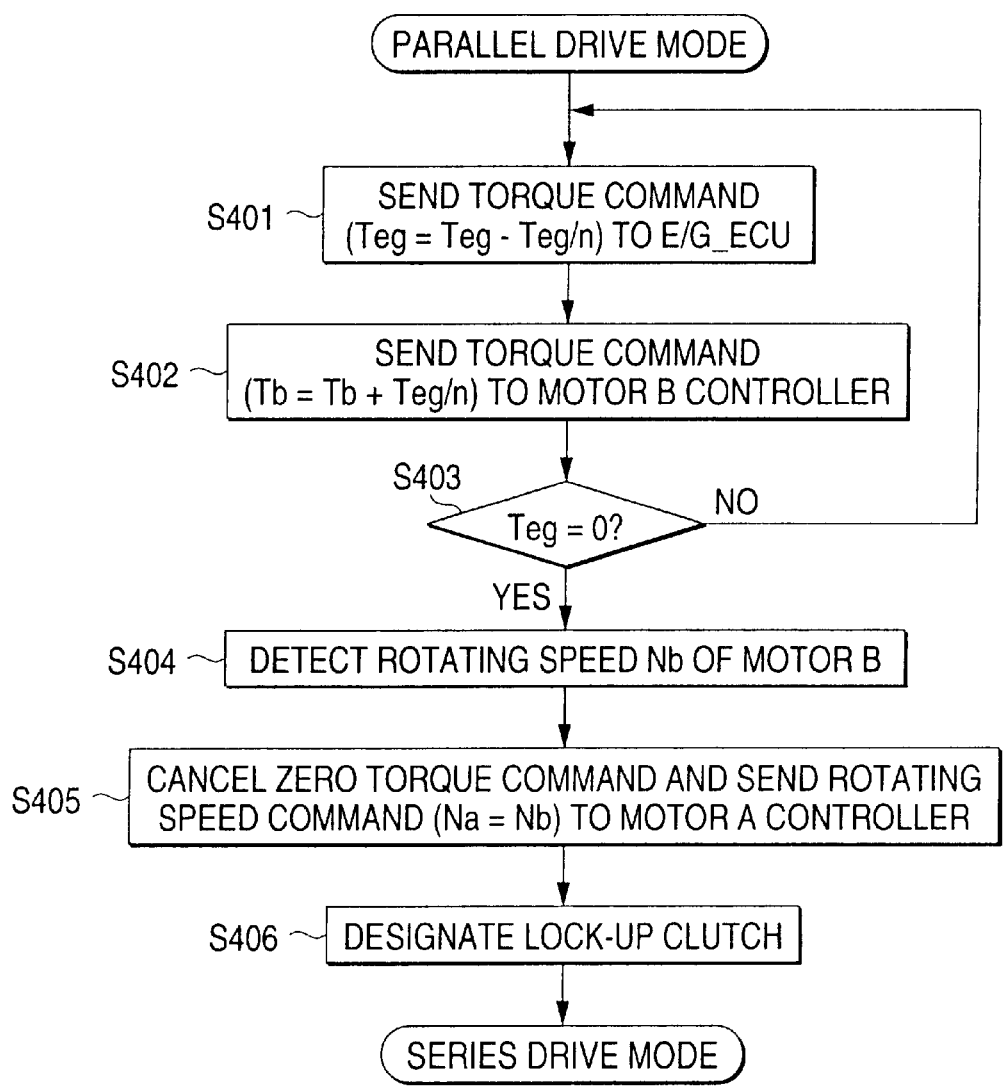
FIG. 4 is a flowchart showing a switching control routine applicable when switching from the parallel drive mode to the series drive mode.
Figure 5:
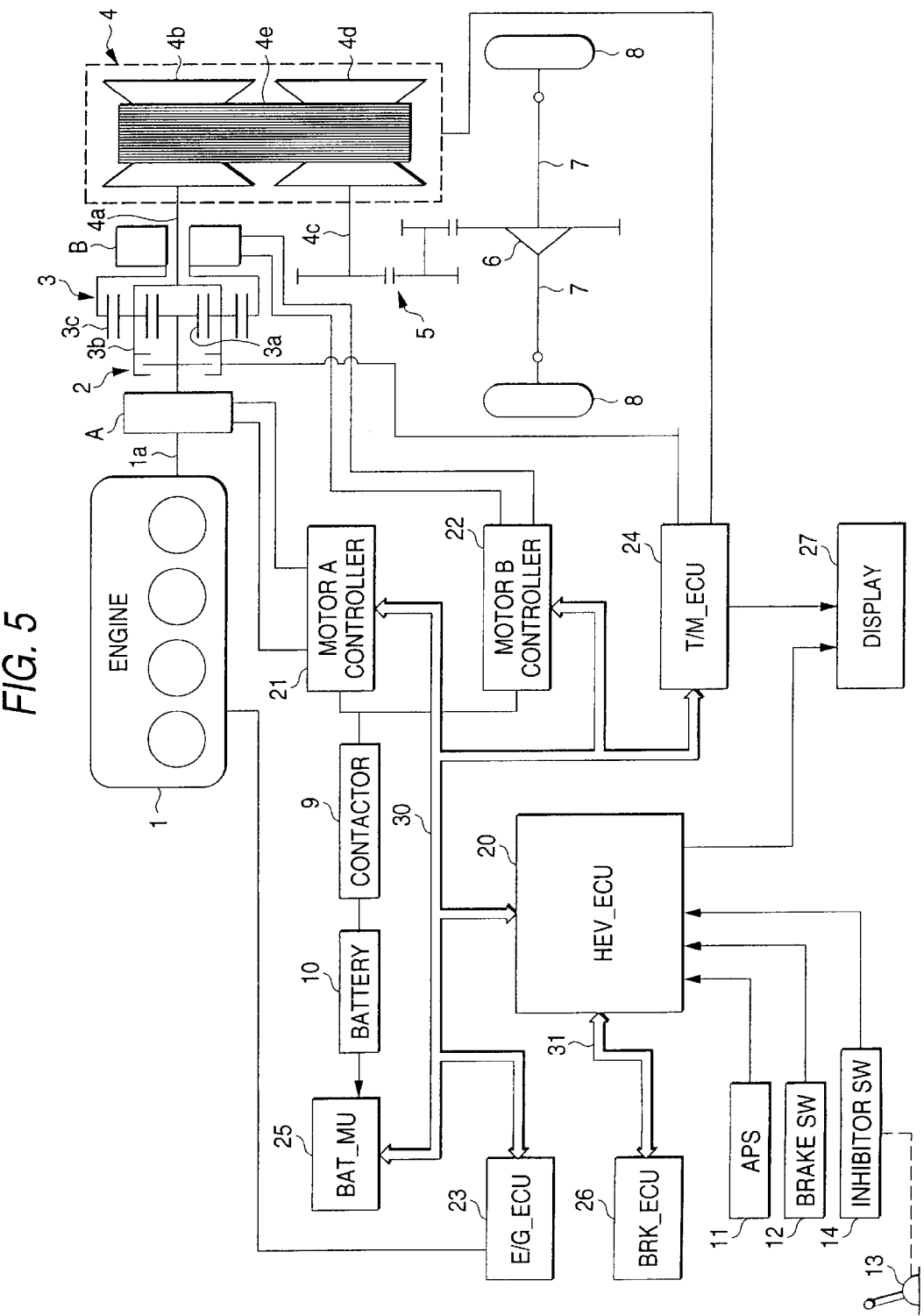
FIG. 5 is an explanatory diagram showing the configuration of a drive control system.
Figure 6:
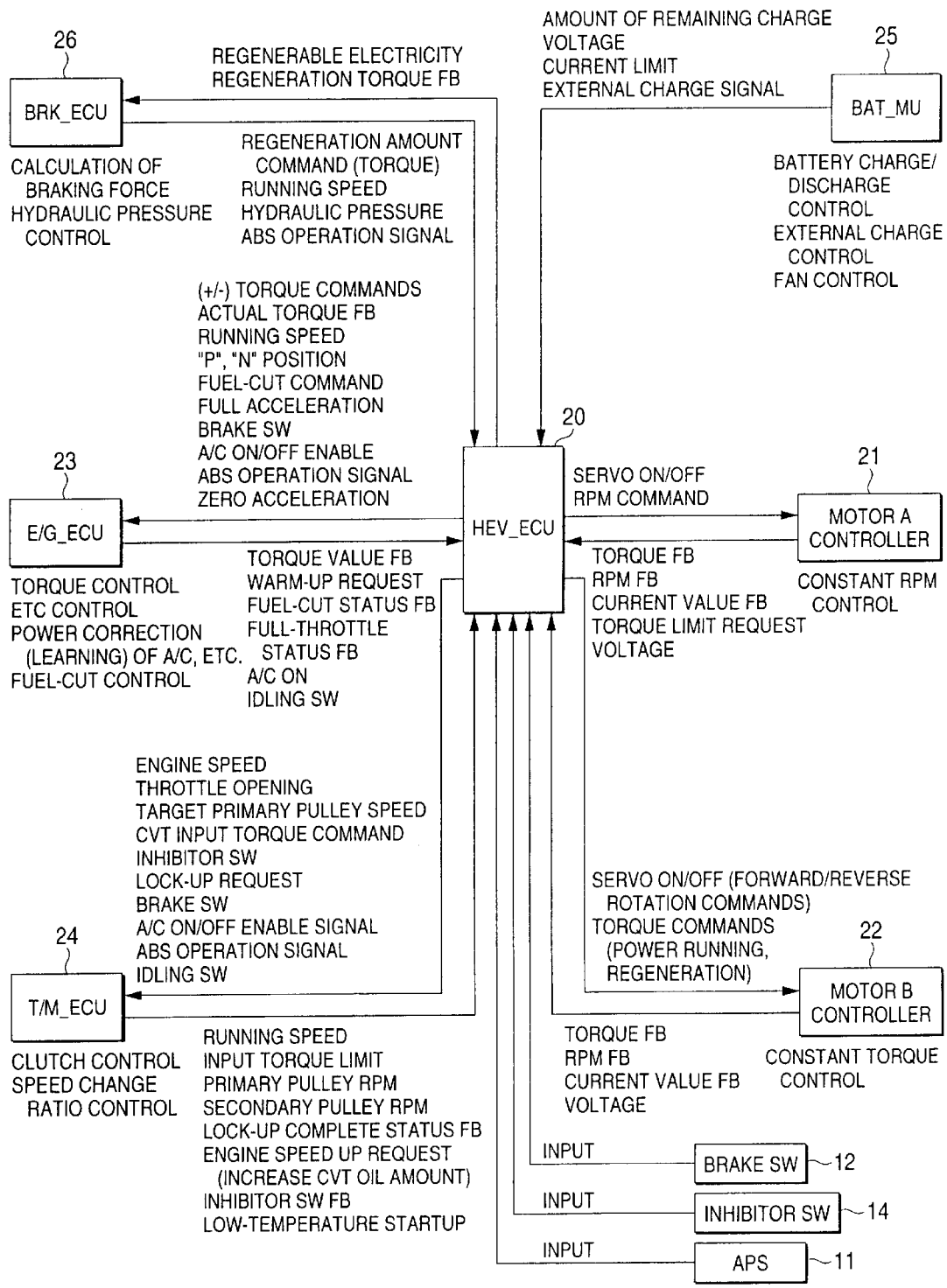
FIG. 6 is an explanatory diagram showing control signal flows around HEV_ECU.
Figure 7:
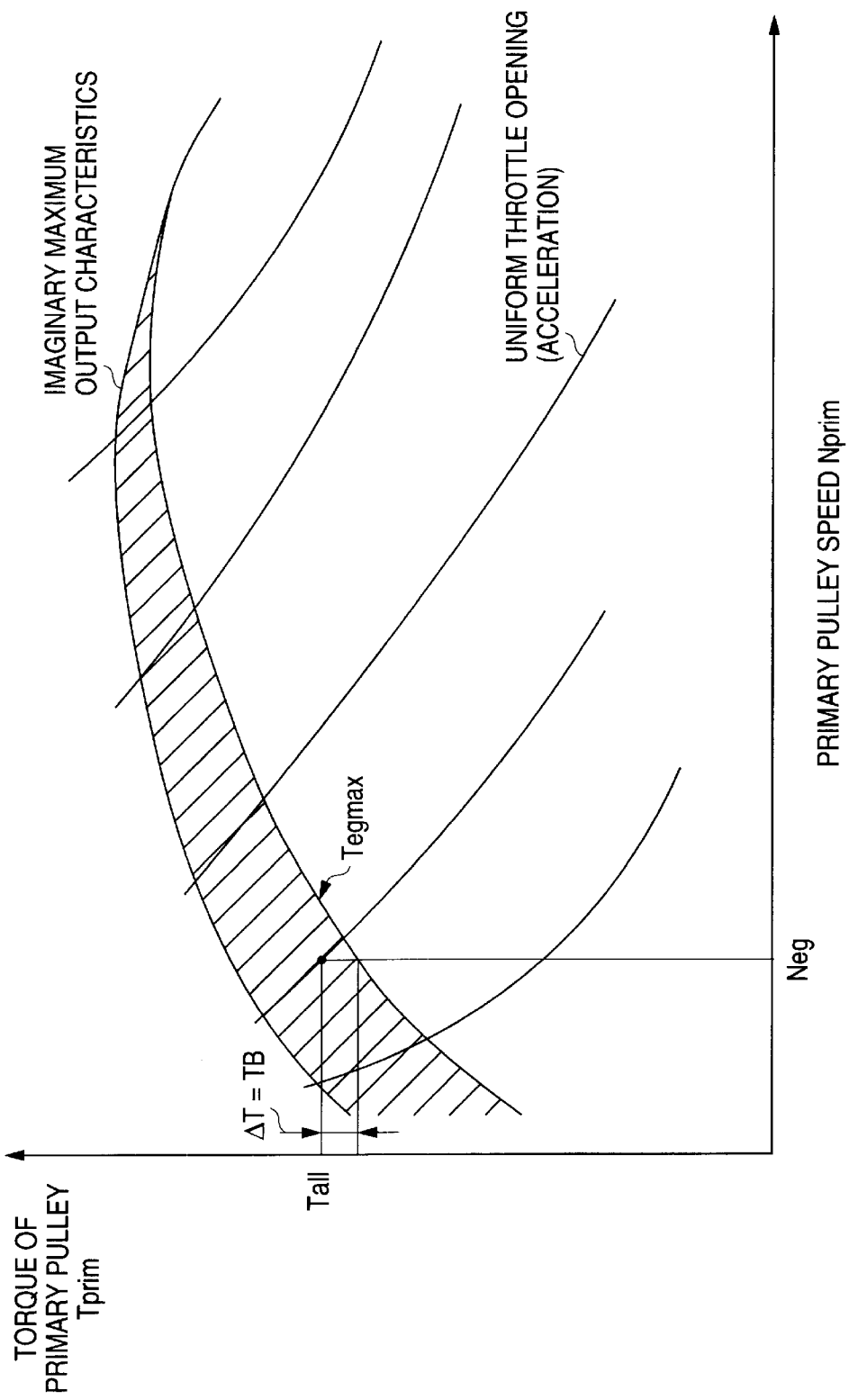
FIG. 7 is an explanatory diagram showing torque distribution between an engine and motors.

A mode of carrying out the invention is described in the following with reference to drawings. FIGS. 1 to 7 pertains to one embodiment of the invention, in which FIG. 1 is a flowchart showing a control routine for series drive mode, FIG. 2 is a flowchart showing a switching control routine applicable when switching from the series drive mode to parallel drive mode, FIG. 3 is a flowchart showing a control routine for the parallel drive mode, FIG. 4 is a flowchart showing a switching control routine applicable when switching from the parallel drive mode to the series drive mode, FIG. 5 is an explanatory diagram showing the configuration of a drive control system, FIG. 6 is an explanatory diagram showing control signal flows around HEV_ECU, and FIG. 7 is an explanatory diagram showing torque distribution between an engine and motors.

A hybrid vehicle according to this invention is a vehicle which jointly uses the engine and motors. As shown in FIG. 5, it comprises an engine 1, a motor A (first motor) which serves to start up the engine 1, generate electric power and provide additional motive power, a planetary gear unit 3 connected to an output shaft 1a of the engine 1 via the motor A, a motor B (second motor) which controls functions of the planetary gear unit 3, works as a source of motive power when the hybrid vehicle is started or driven backwards and serves to recover energy during deceleration, and a power conversion mechanism 4 which serves the function of power conversion by performing speed change and torque magnification operations under normal running conditions.

Specifically, the planetary gear unit 3 is a single-pinion type planetary gear train including a sun gear 3a, a carrier 3b rotatably supporting a pinion which meshes with the sun gear 3a, and a ring gear 3c which meshes with the pinion. The planetary gear unit 3 is associated with a lock-up clutch 2 for engaging and disengaging the sun gear 3a and the carrier 3b.

Although different types of transmissions, such as a transmission including a combination of gear trains or a transmission adopting a hydraulic torque converter, may be used as the power conversion mechanism 4, it is preferable to employ a belt-driven continuously variable transmission (CVT) in which a driving belt 4e is mounted around a primary pulley 4b fitted on an input shaft 4a and a secondary pulley 4d fitted on an output shaft 4c. In this embodiment, the power conversion mechanism 4 is hereinafter described as being the CVT 4.

In the hybrid vehicle's driving system of this invention, the planetary gear unit 3, in which the lock-up clutch 2 is placed between the sun gear 3a and the carrier 3b, is provided between the output shaft 1a of the engine 1 and the input shaft 4a of the CVT 4. The sun gear 3a of the planetary gear unit 3 is connected to the output shaft 1a of the engine 1 via one motor A, the carrier 3b is connected to the input shaft 4a of the CVT 4, and the other motor B is connected to the ring gear 3c. Further, a differential mechanism 6 is connected to the output shaft 4c of the CVT 4 via a reduction gear train 5, and front or rear driving wheels 8 via are connected to the differential mechanism 6 via driving axles 7.

Since the engine 1 and the motor A are connected to the sun gear 3a of the planetary gear unit 3 and the motor B is connected to the ring gear 3c to obtain power output from the carrier 3b, and the output from the carrier 3b is transmitted to the driving wheels 8 after the speed change and torque magnification operations by the CVT 4 as described above, the two motors A, B can be used for both generating electricity and providing motive power, and relatively low-output motors can be employed.

In addition, as the lock-up clutch 2 engages the sun gear 3a and the carrier 3b of the planetary gear unit 3 depending on running conditions, it is possible to form a drive shaft connecting straight from the engine 1 to the CVT 4 with the two motors A, B disposed in between. This arrangement makes it possible to efficiently transmit motive power to the CVT 4 or to utilize a braking force from driving wheels 8.

Flows of electricity due to torque transmission and electric power generation performed by the engine 1 and the motors A, B driven through the planetary gear unit 3 when the lock-up clutch 2 is engaged and disengaged are described in great detail in Japanese Patent Laid-Open No. 4080/1998 filed by the same assignee.

The above-described driving system is controlled by a control system (hybrid control system) for performing driving control of the hybrid vehicle, in which the control system is configured by connecting seven electronic control units (ECUs) by a multiplex communication system, and each ECU is a microcomputer and a functional circuit controlled by the microcomputer. It is preferable to employ a communications network capable of handling high-speed communications. For example, it is possible to employ CAN (Controller Area Network) which is one of ISO standard protocols.

Specifically, the control system is centered around a hybrid ECU (HEV_ECU) 20 for performing overall system management, in which a motor A controller 21 for controlling the driving of the motor A, a motor B controller 22 for controlling the driving of the motor B, an engine ECU (E/G_ECU) 23 for controlling the engine 1, a transmission ECU (T/M_ECU) 24 for controlling the lock-up clutch 2 and the CVT 4 and a battery management unit (BAT_MU) 25 for managing electric power of a battery 10 are connected to the HEV_ECU 20 by a first multiplex communication line 30, and a brake ECU (BRK_ECU) 26 for controlling brakes is connected to the HEV_ECU 20 by a second multiplex communication line 31.

The HEV_ECU 20 controls the entire hybrid control system. Sensors and switches for sensing operations by a driver are connected to the HEV_ECU 20. These include, for example, an accelerator pedal sensor (APS) 11 for sensing the amount of depression of an unillustrated accelerator pedal, a brake switch 12 which is turned on when an unillustrated brake pedal is depressed, an inhibitor switch 14 which becomes on when the set position of a speed range selector mechanism 13 is "P" (parking) or "N" (neutral) and becomes off when the speed range selector mechanism 13 is set at a running position, such as "D" (drive) or "IR" (reverse).

The HEV_ECU 20 calculates necessary vehicle driving torque and determines torque distribution for the driving system based on signals entered from the individual sensors and switches and on data transmitted from the individual ECUs, and sends out control signals to the individual ECUs by multiplex communication as depicted in FIG. 6.

Also connected to the HEV_ECU 20 is a display 27 incorporating various meters for indicating operating conditions of the vehicle, such as running speed, engine speed and battery charge conditions, as well as warning lamps for alerting the driver to the occurrence of anomalies. The display 27 is also connected to the T/M_ECU 24. When any anomaly occurs in the HEV_ECU 20, the T/M_ECU 24 performs an emergency control operation in place of the T/M_ECU 24 an d gives an anomaly indication on the display 27.

On the other hand , the motor A controller 21 is provided with an inverter for driving the motor A. Basically, the motor A controller 21 performs a constant rotating speed control operation for the motor A based on a servo ON/OFF command and a rotating speed command transmitted from the HEV_ECU 20 by multiplex communication. Further, the motor A controller 21 feeds back the torque, rotating speed, current value, etc. of the motor A and transmits such data as a torque limit request and a voltage value to the HEV_ECU 20.

The motor B controller 22 is provided with an inverter for driving the motor B. Basically, the motor B controller 22 performs a constant torque control operation for the motor B based on a servo ON/OFF command (forward or reverse rotation command) and a torque command (power running, regeneration) transmitted by multiplex communication from the HEV_ECU 20. Further, the motor B controller 22 feeds back the torque, rotating speed, current value, etc. of the motor B and transmits such data as a voltage value to the HEV_ECU 20.

The E/G_ECU 23 is basically intended to perform a torque control operation for the engine 1. It controls the amount of fuel injected from an unillustrated injector, throttle opening determined by an ETC (electric throttle valve), a power correction learning operation of auxiliary machinery like an A/C (air conditioner), etc. and a fuel-cut operation based on such control commands as positive/negative torque commands, a fuel-cut command and an air conditioner ON/OFF enable command as well as on actual torque feedback data, running speed, speed range selector position ("P", "N", etc.) from the inhibitor switch 14, full acceleration data or zero acceleration data contained in a signal from the APS 11, brake operating conditions including ON/OFF status of the brake switch 12 and ABS status, and so on which are transmitted from the HEV_ECU 20 by multiplex communication.

Further, the E/G_ECU 23 feeds back a control torque value for the engine 1, fuel-cut execution status, execution status of a full-throttle fuel increase correction to the amount of injected fuel, air conditioner ON/OFF status, zero throttle data from an unillustrated idling switch to the HEV_ECU 20. The E/G_ECU 23 also transmits a warm-up request for the engine 1 to the HEV_ECU 20.

The T/M_ECU 24 controls engagement/disengagement operation of the lock-up clutch 2 and the speed change ratio of the CVT 4 based on such control commands as a target primary pulley speed for the CVT 4, a CVT input torque command and a lock-up request as well as on such information as the engine speed, throttle opening, speed range selector position from the inhibitor switch 14, ON/OFF status of the brake switch 12, air conditioner ON/OFF enable status, brake operating conditions including the ABS, zero throttle data for the engine 1 from the idling switch which are transmitted from the HEV_ECU 20 by multiplex communication.

Further, the T/M_ECU 24 feeds back such data as the running speed, input torque limit, primary pulley speed and secondary pulley speed of the CVT 4, lock-up complete status, speed change status corresponding to the setting of the inhibitor switch 14 to the HEV_ECU 20. The T/M_ECU 24 also transmits an engine speed up request for increasing the amount of oil in the CVT 4 and a low-temperature startup request to the HEV_ECU 20.

The BAT_MU 25 is a so-called power management unit which performs various control operations necessary for the management of the battery 10. Specific ally, the BAT_MU 25 carries out such control operations as charge/discharge control of the battery 10, control of a fan and external charge control, and transmits such data as the amount of charge remaining in the battery 10, its voltage and current limit value, as well as data indicating that the battery 10 is being externally charged to the HEV_ECU 20 by multiplex communication. When charging the battery 10 from an external source, the battery 10 is separated from the motor A controller 21 and the motor B controller 22 by switching a contactor 9.

The BRK_ECU 26 is intended to calculate necessary braking force and control hydraulic pressure of a brake system based on such information as the amount of regenerable electricity and a regeneration torque feedback value transmitted from the HEV_ECU 20 by multiplex communication. The BRK_ECU 26 feeds back a regeneration amount command (torque command), the running speed, hydraulic pressure, and brake operating conditions including the ABS to the HEV_ECU 20.

Drive modes of the hybrid vehicle controlled by the above-described hybrid control system can roughly divided into the following three basic modes as viewed from the side of the transmission input shaft, and the hybrid vehicle is continually switched from one drive mode to another depending on running conditions.

(1) Series (Series & parallel) Drive Mode

When a small driving power is required, the lock-up clutch 2 is disengaged and the motor A is driven by the engine i so that it acts as a generator and, then, the hybrid vehicle runs mainly by means of the motor B. In this case, part of the motive power of the engine 1 is input to the sun gear 3a of the planetary gear unit 3, combined with the motive power of the motor B which is connected to the ring gear 3c, and output through the carrier 3b.

(2) Parallel Drive Mode

When a large driving power is required, the lock-up clutch 2 is engaged to connect the sun gear 3a of the planetary gear unit 3 to the carrier 3b, whereby the motive power of the motor B fed from the ring gear 3c is added to the motive power of the engine 1 and the sum is output through the carrier 3b. In this case, the hybrid vehicle runs by means of the engine 1 alone or by using the torque supplied from both the engine 1 and the motor B.

(3) Braking Force Regeneration Mode

During deceleration, the hybrid vehicle recovers the braking force by means of the motor B while performing a brake control operation in a coordinated manner. Specifically, the hybrid vehicle carries out a regenerative braking operation by dividing a total braking torque corresponding to the amount of depression of the brake pedal into a regeneration torque carried by the motor B and a braking torque taken by the brake system.

Control operations performed by the HEV_ECU 20 in the series drive mode and the parallel drive mode and for switching between the series drive mode and the parallel drive mode are described below referring to the flowcharts of FIGS. 1 to 4.

FIG. 1 shows the control routine for the series drive mode. When a rotating speed command which causes the motor A to run at a specified rotating speed is given to the motor A controller 21 by multiplex communication in step S101, vehicle driving torque Tall is calculated from the amount of depression of the accelerator pedal based on an output from the APS 11 in step S102.

Next, the operation flow proceeds to step S103, in which torque Tr of the ring gear side and torque Ts of the sun gear side are calculated according to equations (1) and (2) below using the planetary gear ratio (constant K) of the planetary gear unit 3. Then in step S104, power Wb required by the motor B which is connected to the ring gear 3c is calculated from the rotating speed of the motor B and the torque Tr of the ring gear side.

$$Tr=Tall\times(1-K)/K \tag{1}$$

$$Ts=Tall\times K \tag{2}$$

Specific charging power Wa is calculated from the amount of charge remaining in the battery 10 in step S105, and torque Tbat required for power generation is calculated from the power Wb required by the motor B, the charging power Wa for the battery 10 and the rotating speed of the motor A in step S106. Then in step S107, the torque Ts of the sun gear side and the power generation torque Tbat are added to obtain driving torque Teg of the engine 1 as shown in equation (3) below:

$$Teg=Ts+Tbat \tag{3}$$

Subsequently, the operation flow proceeds to step S108, in which a judgment is made as to whether the driving torque Teg calculated in step S107 above can be output from the engine 1 based on the electric power output of the motor A and output characteristics of the engine 1. If it is difficult to output the driving torque Teg, the rotating speed setting for the motor A is changed and a new rotating speed command is sent to the motor A controller 21. Then, the power generation torque Tbat is calculated again from the power Wb required by the motor B, the charging power Wa for the battery 10 and the rotating speed of the motor A, and the driving torque Teg of the engine 1 is obtained by adding the power generation torque Tbat and the torque Ts of the sun gear side.

In step S109, the torque Tr of the ring gear side which should be produced by the motor B is sent to the motor B controller 22 in the form of a torque command by multiplex communication. Then in step S110, a torque command corresponding to the driving torque Teg is sent to the E/G_ECU 23 by multiplex communication and the operation flow proceeds to step S111.

In step S111, driving operation by use of the motor B is controlled according to a feedback value of the vehicle driving torque that is calculated from feedback values from the motor A controller 21, the motor B controller 22 and the E/G_ECU 23 and, then, the current routine is finished.

Specifically, the HEV_ECU 20 adds a power generation torque feedback value Ta' of the motor A received from the motor A controller 21 and a reaction force (Tb'×K/(1−K)) due to the torque of the motor B, which is obtained from a torque feedback value Tb' of the motor B, feeds back the sum to the E/G_ECU 23. The E/G_ECU 23 learns the difference between the torque command value Teg and the feedback value (Ta'+Tb'×K/(1−K)) fed from the HEV-ECU 20 and controls the engine 1 accordingly.

The difference between a torque feedback value Teg' of the engine 1 and the torque feedback value Ta' of the motor A is added to the torque feedback value Tb' of the motor B to obtain the feedback value of the vehicle driving torque, and the driving operation by use of the motor B is controlled according to the feedback value of the vehicle driving torque (Tb'+Teg'+Ta').

Accordingly, in the light-load series drive mode in which the required driving power is small, the battery 10 can be recharged to make up for its electric power consumed by driving the motor B while bearing the reaction force of the motor B with the engine 1 and the motor A, and this makes it possible to accomplish stable constant torque running.

If the accelerator pedal is further depressed and the required driving power increases while the vehicle is being driven in the above-described series drive mode, it is switched from the series drive mode to the parallel drive mode.

Transition from the series drive mode to the parallel drive mode is made according to the switching control routine of FIG. 2, in which, after matching the rotating speed of the motor B with that of the motor A, the torque of the engine 1 is set to zero and the lock-up clutch 2 is engaged. More particularly, the HEV_ECU 20 determines the rotating speed Nb of the motor B from rotating speed data fed back from the motor B controller 22 in step S201 and, then, sends a rotating speed command to the motor A controller 21 by multiplex communication in step S202 in order to match the rotating speed Na of the motor A with the rotating speed Nb of the motor B.

Subsequently, the HEV_ECU 20 determines the actual rotating speed Na of the motor A from rotating speed data fed back from the motor A controller 21 in step S203 and checks whether the actual rotating speed Na of the motor A has become equal to the rotating speed Nb of the motor B in step S204. If Na≠Nb, the operation flow returns from step S204 to step S201 and the aforementioned steps for matching the rotating speed of the motor A with that of the motor B are reexecuted.

When the rotating speed Na of the motor A equals the rotating speed Nb of the motor B in step S204, the operation flow proceeds from step S204 to step S205, in which a torque command for setting the torque Teg of the engine 1 to zero is sent to the E/G_ECU 23 by multiplex communication. Then instep S206, a command for engaging the lock-up clutch 2 is sent to the T/M_ECU 24 by multiplex communication and the vehicle is switched to the parallel drive mode.

Since the lock-up clutch 2 can be engaged upon making the driving torque of the engine 1 substantially equal to zero after the rotating speed of the motor A has been substantially matched with the rotating speed of the motor B when switching the vehicle from the series drive mode to the parallel drive mode, it is possible to smoothly perform the mode switching operation without causing fluctuations in rotating speed or in torque. Thus, the driver would not have abnormal feelings when driving the vehicle.

Next, in the parallel drive mode, the torque distribution between the engine 1 and the motor B is determined by the control routine of FIG. 3, in which the vehicle runs with the engine 1 alone or with the engine 1 assisted by the motor B (motor-assisted driving operation).

In this parallel drive control routine, when the lock-up clutch 2 is engaged and the vehicle is switched to the parallel drive mode, a zero torque command which sets the torque of the motor A to zero is sent to the motor A controller 21 by multiplex communication in step S301.

More specifically, the lock-up clutch 2 is engaged to connect the sun gear 3a of the planetary gear unit 3 to the carrier 3b, whereby the motive power of the motor B fed from the ring gear 3c is added to the motive power of the engine 1 and the sum is output through the carrier 3b in the parallel drive mode. Therefore, in order to transmit the whole output torque of the engine 1 and the motor B to the driving wheel side, it is necessary to set the r.p.m. of the motor A, but its control is very difficult. If the motor A is run by the same rotating speed control operation as in the series drive mode, the driving torque is absorbed by the motor A. On the contrary, if the rotating speed control operation for the motor A is stopped, the output torque of the engine 1 and the motor B is reduced due to core loss.

In any case, it is difficult to control the vehicle driving torque in the parallel drive mode if the motor A is run by the same rotating speed control operation as in the series drive mode. Thus, in the parallel drive mode, the zero torque command is sent to the motor A controller 21 which controls the rotating speed of the motor A to reduce its output torque down to zero by means of its magnetic field, for instance, so that the output torque of the engine 1 and the motor B is fed into the CVT 4 without loss.

After running the motor A at zero torque, the operation flow proceeds to step S302, in which the vehicle driving torque Tall is calculated from the amount of depression of the accelerator pedal based on the output from the APS 11. Then in step S303, a judgment is made to determine whether the amount of charge remaining in the battery 10 is equal to or greater than a specified value. If the amount of charge remaining in the battery 10 is smaller than the specified value, the operation flow proceeds to step S304, in which a specific torque command is sent to the E/G_ECU 23 by multiplex communication so that the vehicle runs with the engine 1 alone according to the throttle opening and, then, the operation flow proceeds to step S310.

On the other hand, if the amount of charge remaining in the battery 10 is equal to or greater than the specified value instep S303, the operation flow proceeds to step S305, in which maximum engine output torque Tegmax is calculated from the throttle opening of the engine 1 and the primary pulley speed of the CVT 4. Then, the difference ΔT between the vehicle driving torque Tall and the maximum engine output torque Tegmax is calculated (ΔT=Tall−Tegmax) in step S306, and the difference ΔT is set as driving torque Tb of the motor B (Tb=ΔT) in S307.

In the parallel drive mode, imaginary maximum output characteristics of the whole vehicle are defined based on the maximum output torque Tegmax, which is determined by uniform throttle opening curves of the engine 1, and maximum driving torque of the motor B as shown in FIG. 7. When the required vehicle driving torque Tall is larger than the maximum output torque Tegmax of the engine 1, the difference (Tall−Tegmax) is set as the driving torque to be supplemented by the motor B.

Subsequently, a torque command specifying the maximum engine output torque Tegmax is sent to the E/G_ECU 23 by multiplex communication in step S308, and a torque command specifying the driving torque Tb is sent to the motor B controller 22 by multiplex communication in step S309. In step S310, the vehicle driving operation is controlled using the sum (Tb'+Teg') of the torque feedback value Tb' of the motor B received from the motor B controller 22 and the torque feedback value Teg' of the engine 1 received from the E/G_ECU 23 as a feedback value of the vehicle driving torque and, then, the current routine is finished.

In the foregoing parallel drive mode, it is possible to transmit the output torque of the engine 1 and the motor B to the driving wheel side without loss by simple commands and limited constant torque control operation without completely switching the motor A from the rotating speed control operation to torque control operation, so that the vehicle driving torque can be easily controlled.

Transition from the parallel drive mode to the series drive mode is made according to the switching control routine of FIG. 4. In this routine, the output torque of the engine 1 is gradually reduced and the motor B is controlled to output a torque corresponding to the amount of reduction in the engine torque. When the output torque of the engine 1 has become zero, the zero torque command for the motor A is canceled, the rotating speed of the motor A is matched with that of the motor B, and the lock-up clutch 2 is disengaged.

More particularly, a torque command specifying a torque value Teg (Teg=Teg-Teg/n) which is obtained by reducing the driving engine torque Teg by a specified ratio 1/n is sent to the E/G_ECU 23 by multiplex communication in step S401. Then in step S402, the amount of reduction in the driving engine torque Teg/n is added to the current driving torque Tb of the motor B, the sum (Tb+Tb/n) is set as a new driving torque Tb of the motor B, and a torque command specifying the new driving torque Tb is sent to the motor B controller 22 by multiplex communication.

In step S403, a judgment is made to check whether the driving engine torque Teg has become zero. If Teg≠0, the operation flow returns from step S403 to step S401 and the aforementioned operation is reexecuted, in which the output torque of the engine 1 is reduced by a specified amount and the output torque of the motor B is increased by the same amount.

Subsequently, when the driving engine torque Teg has become zero in step S403, the operation flow proceeds to step S404, in which the rotating speed Nb of the motor B is determined. In step S405, the zero torque command for the motor A previously sent to the motor A controller 21 is canceled and a rotating speed command is sent to the motor A controller 21 in order that the rotating speed Na of the motor A equals the rotating speed Nb of the motor B. Then in step S406, a command for disengaging the lock-up clutch 2 is sent to the T/M_ECU 24 and, then, the current routine is finished.

When switching the vehicle from the parallel drive mode to the series drive mode, the output torque of the engine 1 is gradually reduced down to zero and the motor B is controlled to output a torque corresponding to the amount of reduction in the engine torque before the rotating speed of the motor A is matched with that of the motor B and the lock-up clutch 2 is disengaged. Therefore, the switching from the parallel drive mode to the series drive mode can be made without causing fluctuations in rotating speed or in torque, and this makes it possible to prevent deterioration of a feeling of comfortable driving.

As thus far described, when switching a vehicle from series drive mode to parallel drive mode, a lock-up clutch is engaged upon making the driving torque of an engine substantially equal to zero after substantially matching the rotating speed of a first motor which is connected between an output shaft of the engine and a sun gear of a planetary gear with the rotating speed of a second motor which is connected to a ring gear of the planetary gear. When switching the vehicle from the parallel drive mode to the series drive mode, the driving torque of the engine is gradually reduced while gradually increasing the driving torque of the second motor by an amount corresponding to the amount of reduction in the driving torque of the engine, and the lock-up clutch is disengaged after substantially matching the rotating speed of the first motor with the rotating speed of the second motor at the time the driving torque of the engine has become substantially zero. Consequently, it is possible to obtain such advantageous effects that fluctuations in rotating speed or in toque due to engagement/disengagement operation of the lock-up clutch are prevented and smooth running is achieved without deteriorating a feeling of comfortable driving.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A control system for a hybrid vehicle having an internal combustion engine mounted on said vehicle for outputting a driving force via an output shaft, a lockup clutch mechanically and coaxially connected to said engine for connecting and disconnecting said driving force to a driving wheel, a transmission rotatably connected to said lockup clutch for changing a rotating speed thereof, a battery mounted on said hybrid vehicle for storing and providing an electric energy therefrom to various electric equipment, an accelerator pedal sensor provided in vicinity of an accelerator pedal for detecting a depressed amount thereof and for producing an accelerator signal, a brake switch provided near a brake pedal for detecting whether or not a driver steps thereon and for generating a brake signal when said driver steps thereof, and an inhibitor switch attached on a gear select mechanism for detecting whether a select lever is set in a drive range (D) and a rear range (R) or not and for outputting an ON signal when said lever is set in at least either one of said ranges, comprising:

a first motor (A) interposed between said output shaft and said lockup clutch and electrically connected to said battery for generating an auxiliary electric energy and for returning thereof to said battery when said lockup clutch is released while said vehicle is running in a series running mode;

a second motor (B) interposed between said first motor (A) and said transmission and electrically connected to said battery for assisting said engine when said lockup clutch is connected while said vehicle is running in a parallel running mode;

a planetary gear interposed between said lockup clutch and said second motor (B) for alternatively and effectively using said motors (A) and (B) so as to be changeable to a motor or a generator as required; and electronic hybrid engine control means responsive to said accelerator signal, said brake signal, said ON signal for connecting said lockup clutch after setting said driving force to substantially zero in addition to making an r.p.m. of said first motor (A) to coincide with an r.p.m. of said secondmotor (B) when a driving condition is transiting from said series running mode to said parallel running mode and for disconnecting said lockup clutch after making said r.p.m. of said first motor (A) to coincide with said r.p.m. of said second motor by gradually increasing said r.p.m. of said second motor (B) at the time of when said driving force becomes substantially zero by incrementally adding a driving torque of said second motor (B) as much as a decreased torque of said engine when said driving condition is transiting from said parallel running mode to said series running mode in addition to gradually decreasing said driving force.

2. A control method for a hybrid vehicle having, an internal combustion engine mounted on said vehicle for outputting a driving force via an output shaft, a lockup clutch mechanically and coaxially connected to said engine for connecting and disconnecting said driving force to a driving wheel, a transmission rotatably connected to said lockup clutch for changing a rotating speed thereof, a battery mounted on said hybrid vehicle for storing and providing an electric energy therefrom to various electric equipment, an accelerator pedal sensor provided in vicinity of an accelerator pedal for detecting a depressed amount thereof, a brake switch provided near a brake pedal for detecting whether or not a driver steps thereon, and an inhibitor switch attached on a gear select mechanism for detecting whether a select lever is set in a drive range (D) and a rear range (R) or not, comprising the steps of:

generating a first auxiliary electric energy by interposing a first motor (A) between said output shaft and said lockup clutch and by electrically connecting to said battery when said lockup clutch is released while said vehicle is running in a series running mode;

assisting said engine by a second motor (B) interposed between said first motor (A) and said transmission and electrically connected to said battery when said lockup clutch is connected while said vehicle is running in a parallel running mode;

interposing a planetary gear between said lockup clutch and said second motor (B) in order to alternatively and effectively use said motors (A) and (B) as required; and connecting said lockup clutch by electronic hybrid engine control means after setting said driving force to substantially zero in addition to making an r.p.m. of said first motor (A) to coincide with an r.p.m. of said second motor (B) when a driving condition is transiting from said series running mode to said parallel running mode; and disconnecting said lockup clutch after making said r.p.m. of said first motor (A) to coincide with said r.p.m. of said second motor by gradually increasing said r.p.m. of said second motor (B) at the time of when said driving force becomes substantially zero by incrementally adding a driving torque of said second motor (B) as much as a decreased amount of torque of said engine when said driving condition is transiting from said parallel running mode to said series running mode in addition to gradually decreasing said driving force.

* * * * *